US012583306B2

(12) United States Patent
Saito

(10) Patent No.: US 12,583,306 B2
(45) Date of Patent: Mar. 24, 2026

(54) BATTERY SUPPORT FRAME STRUCTURE

(71) Applicant: ISUZU MOTORS LIMITED, Tokyo (JP)

(72) Inventor: Hayato Saito, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 286 days.

(21) Appl. No.: 18/546,229

(22) PCT Filed: Mar. 18, 2022

(86) PCT No.: PCT/JP2022/012915
§ 371 (c)(1),
(2) Date: Aug. 11, 2023

(87) PCT Pub. No.: WO2022/202724
PCT Pub. Date: Sep. 29, 2022

(65) Prior Publication Data
US 2024/0116353 A1 Apr. 11, 2024

(30) Foreign Application Priority Data

Mar. 22, 2021 (JP) ................................. 2021-046932

(51) Int. Cl.
*B60K 1/04* (2019.01)
*B60L 50/60* (2019.01)
(Continued)

(52) U.S. Cl.
CPC ........ *B60K 1/04* (2013.01); *B60K 2001/0461* (2013.01); *B60K 2001/0494* (2013.01);
(Continued)

(58) Field of Classification Search
CPC .............. B60K 1/04; B60K 2001/0461; B60K 2001/0494; H01M 50/204; B60L 50/66
See application file for complete search history.

(56) References Cited

U.S. PATENT DOCUMENTS 7,520,355 B2 * 4/2009 Chaney
8,672,354 B2 * 3/2014 Kim
(Continued)

FOREIGN PATENT DOCUMENTS

CN 103269941 A 8/2013
CN 102804448 A 5/2015
(Continued)

OTHER PUBLICATIONS

Patent Cooperation Treaty, International Search Report, Application No. PCT/JP2022/012915, dated Apr. 26, 2022, in 4 pages.

*Primary Examiner* — James A Shriver, II
*Assistant Examiner* — Nicholas R. Kandas
(74) *Attorney, Agent, or Firm* — PROCOPIO, CORY, HARGREAVES & SAVITCH LLP

(57) ABSTRACT

A battery support frame structure S has: a plurality of side members 1 extending in the longitudinal direction of a vehicle and having a hole 11 that passes therebetween and is formed in the vehicle width direction; and a battery 2 that is inserted into the hole 11 of the plurality of side members 1 and is longer in the vehicle width direction than the length between the plurality of side members 1. Additionally, the side members 1 extend in a straight line in the vehicle longitudinal direction. The battery support frame structure S additionally has a first member 3 that extends along the battery 2 above the battery 2 in the vehicle height direction, and a second member 4 that extends along the battery 2 below the battery 2 in the vehicle height direction.

11 Claims, 4 Drawing Sheets

(51) Int. Cl.
  *B62D 21/02* (2006.01)
  *H01M 50/204* (2021.01)
(52) U.S. Cl.
  CPC .............. *B60L 50/66* (2019.02); *B62D 21/02*
    (2013.01); *H01M 50/204* (2021.01)

(56) References Cited

U.S. PATENT DOCUMENTS

| | | | | |
|---|---|---|---|---|
| 11,043,714 | B2 * | 6/2021 | Sloan | |
| 11,066,104 | B2 * | 7/2021 | Kim | |
| 11,285,796 | B2 * | 3/2022 | Choi | |
| 11,613,172 | B2 * | 3/2023 | Yun | |
| 11,807,306 | B2 * | 11/2023 | Kim ...................... | B60K 15/07 |
| 2004/0134699 | A1 | 7/2004 | Shimizu | |
| 2012/0125704 | A1 | 5/2012 | Kawaguchi et al. | |
| 2021/0143381 | A1 | 5/2021 | Ieradi | |
| 2024/0149657 | A1 * | 5/2024 | Coupal-Sikes | |

FOREIGN PATENT DOCUMENTS

| | | | |
|---|---|---|---|
| CN | 105438262 | A | 3/2016 |
| CN | 107933279 | A | 4/2018 |
| CN | 207530003 | U | 6/2018 |
| CN | 110073513 | A | 7/2019 |
| DE | 10248657 | A1 | 4/2004 |
| DE | 10005285 | A1 | 11/2009 |
| EP | 1440832 | A1 | 7/2004 |
| EP | 2658768 | B1 | 9/2017 |
| EP | 3239021 | B1 | 3/2021 |
| JP | H05-056546 | U | 7/1991 |
| JP | H05-208617 | A | 8/1993 |
| JP | 2004-009986 | A | 1/2004 |
| JP | 2020-184486 | A | 11/2020 |

* cited by examiner

BATTERY SUPPORT FRAME STRUCTURE

CROSS-REFERENCE TO RELATED APPLICATIONS

The present application is a U.S. National Stage entry of PCT Application number PCT/JP2022/012915, filed on Mar. 18, 2022, which claims priority under 35 U.S.C § 119(a) to Japanese Patent Application No. 2021-046932, filed on Mar. 22, 2021, contents of which are incorporated herein by reference in their entirety.

TECHNICAL FIELD

The present disclosure relates to a battery support frame structure of a vehicle.

BACKGROUND OF THE INVENTION

The vehicle is provided with a frame structure. Patent Document 1 discloses a vehicle having a first side member to which a first battery structure is fixed and a second side member to which a second battery structure is fixed.

PRIOR ART

Patent Document

Patent Document 1: Japanese Unexamined Patent Application Publication No. 2020-184486

BRIEF DESCRIPTION OF THE INVENTION

Problem to be Solved by the Invention

When a battery is provided to a frame structure having a plurality of side members whose longitudinal direction is the same as a front-rear direction of a vehicle, the battery may be provided while being divided into inside and outside the plurality of side members in a vehicle width direction of the vehicle. In this case, for each battery being provided inside and outside the plurality of side members, it is necessary to provide i) an elastic member to suppress stress on the battery caused by forces applied by the side members and ii) a space for the battery to be displaced between the battery and the side member, respectively. For this reason, it was difficult to increase a volume of a battery.

The present disclosure focuses on this point, and an object thereof is to provide a battery support frame structure that makes it possible to easily increase a volume of a battery.

Means for Solving the Problem

A first aspect of the disclosure provides a battery support frame structure that includes a plurality of side members whose longitudinal direction is the same as a front-rear direction of a vehicle and have holes penetrating therethrough in a vehicle width direction of the vehicle, and a battery that is inserted in the holes of the plurality of side members and has a length greater than a length between the plurality of side members in the vehicle width direction.

Further, the side members may be linear in the front-rear direction. Furthermore, the battery support frame structure may further include a first member that is provided above the battery in a height direction of the vehicle, and a second member that is provided below the battery in the height direction.

In addition, a left side member provided to a left portion in the vehicle width direction, and a right side member provided to a right portion in the vehicle width direction may be provided as the plurality of side members, wherein a first central member provided between the left side member and the right side member, a first left member provided on the left of the left side member in the vehicle width direction, and a first right member provided on the right of the right side member in the vehicle width direction may be provided as the first member, wherein a second central member provided between the left side member and the right side member, a second left member provided on the left of the left side member in the vehicle width direction, and a second right member provided on the right of the right side member in the vehicle width direction may be provided as the second member, wherein (i) a length in the vehicle width direction between a left end of the first left member and a right end of the first right member and (ii) a length in the vehicle width direction between a left end of the second left member and a right end of the second right member may be greater than the length of the battery in the vehicle width direction.

Further, the battery support frame structure may further include a third member that is provided in front of the battery in the front-rear direction, and a fourth member that is provided behind the battery in the front-rear direction.

Furthermore, a third central member provided between the left side member and the right side member, a third left member provided on the left of the left side member in the vehicle width direction, and a third right member provided on the right of the right side member in the vehicle width direction may be provided as the third member, wherein a fourth central member provided between the left side member and the right side member, a fourth left member provided on the left of the left side member in the vehicle width direction, and a fourth right member provided on the right of the right side member in the vehicle width direction may be provided as the fourth member, wherein (i) a length in the vehicle width direction between a left end of the third left member and a right end of the third right member and (ii) length in the vehicle width direction between a left end of the fourth left member and a right end of the fourth right member may be greater than the length of the battery in the vehicle width direction.

In addition, the battery support frame structure may further include a left frame whose longitudinal direction is the same as the front-rear direction and is provided on the left of the left side member in the vehicle width direction, and a right frame whose longitudinal direction is the same as the front-rear direction and is provided on the right of the right side member in the vehicle width direction, wherein the left frame may be fixed to a left end of the first left member, a left end of the second left member, a left end of the third left member, and a left end of the fourth left member, and the right frame may be fixed to a right end of the first right member, a right end of the second right member, a right end of the third right member, and a right end of the fourth right member.

Effect of the Invention

According to the present disclosure, a volume of a battery can be easily increased in a battery support frame structure.

DESCRIPTION OF EMBODIMENTS

[Structure of Battery Support Frame Structure S]

Figure 1:
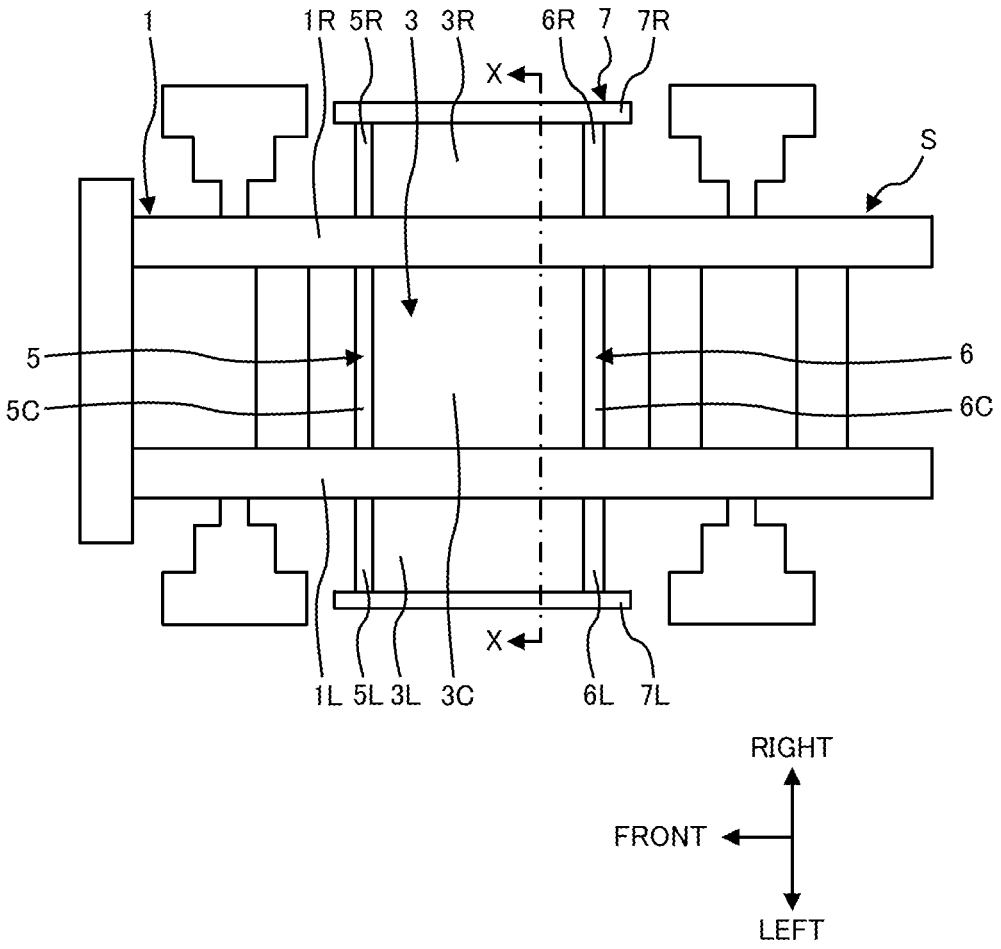
FIG. 1 shows a structure of a battery support frame structure according to the embodiment.
Figure 2:
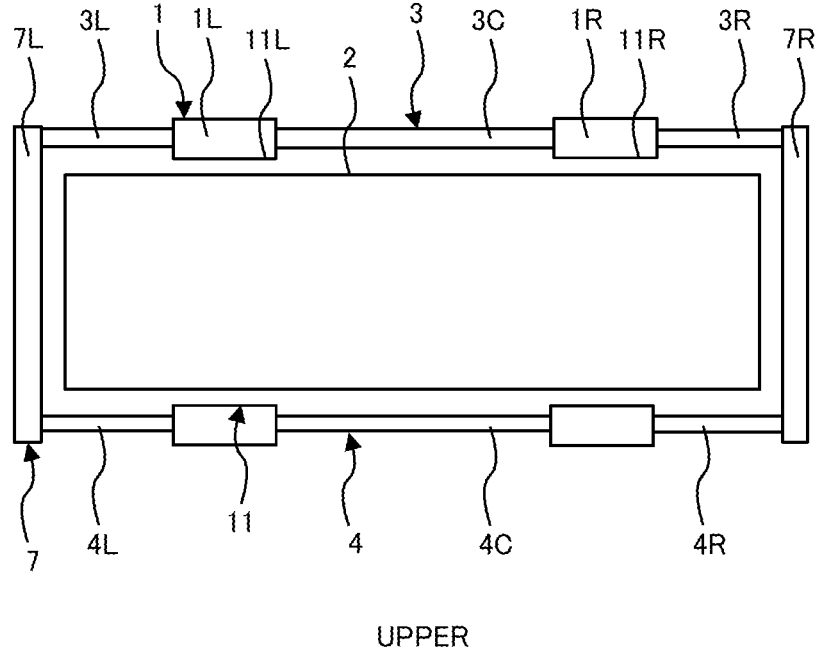
FIG. 2 is a cross-sectional view at a line X-X in FIG. 1.

FIG. 1 shows a structure of a battery support frame structure S according to the embodiment. FIG. 2 is a cross-sectional view at a line X-X in FIG. 1.

The battery support frame structure S includes a plurality of side members 1, a battery 2, a first member 3, a second member 4, a third member 5, a fourth member 6, and a plurality of frames 7. The longitudinal direction of the side member 1 is the same as a front-rear direction of a vehicle. The side member 1 is linear in the front-rear direction of the vehicle. The side member 1 has a hole 11 as shown in FIG. 2. The hole 11 penetrates through the side member 1 in a vehicle width direction of the vehicle. The battery 2, described later, is inserted into the hole 11.

The battery support frame structure S includes a left side member 1L and a right side member 1R as the plurality of side members 1. The left side member 1L is provided to a left portion of the vehicle in the vehicle width direction. The left side member 1L has a hole 11L. The hole 11L penetrates through the left side member 1L in the vehicle width direction of the vehicle. The battery 2, described later, is inserted into the hole 11L.

The right side member 1R is provided to a right portion of the vehicle in the vehicle width direction. The right side member 1R has a hole 11R. The hole 11R penetrates through the right side member 1R in the vehicle width direction of the vehicle. The battery 2, described later, is inserted into hole 11R.

The battery 2 is used as a power supply battery for driving a traveling motor of a hybrid vehicle or an electric vehicle (EV). The battery 2 includes a plurality of battery modules (not shown in figures) and an accommodation part (not shown in figures). The battery module includes a plurality of battery cells (not shown in figures). The battery cells store electric power. The accommodation part accommodates the plurality of battery modules.

The battery 2 is inserted into the holes 11 of the plurality of side members 1. Specifically, in the embodiment, the battery 2 is inserted into the hole 11 of one side member 1 and the hole 11 of the other side member 1.

The battery 2 is supported by the plurality of side members 1 via elastic members (not shown in figures) while the battery 2 is inserted into the holes 11 of the plurality of side members 1. A length of the battery 2 in the vehicle width direction of the vehicle is greater than a length between the plurality of side members 1. The length of the battery 2 in the vehicle width direction of the vehicle is greater than a length in the vehicle width direction of the vehicle between the left end of the left side member 1L and the right end of the right side member 1R.

Figure 3:
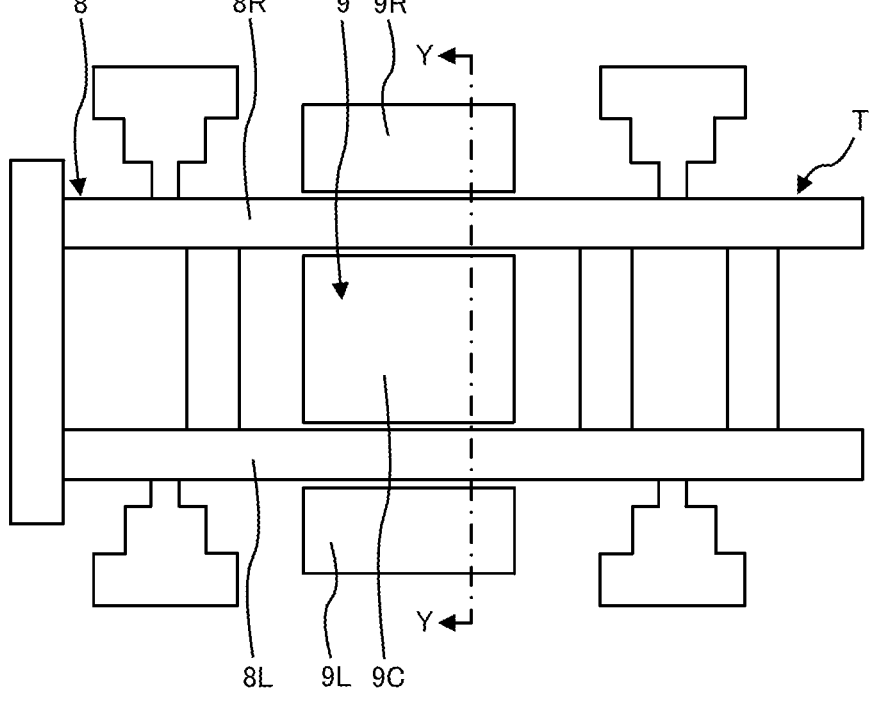
FIG. 3 shows a structure of a conventional battery support frame structure as a comparative example.
Figure 4:
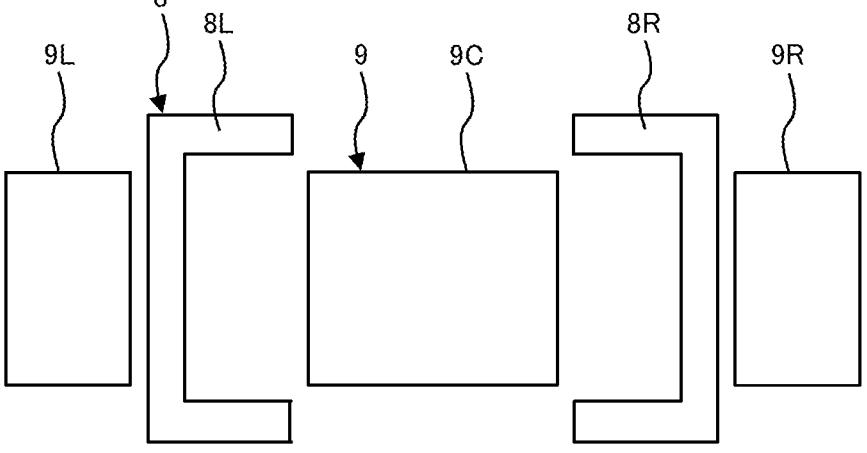
FIG. 4 is a cross-sectional view at a line Y-Y in FIG. 3.
Figure 4:
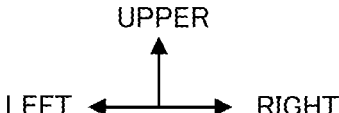

FIG. 3 shows a structure of a conventional battery support frame structure T as a comparative example. FIG. 4 is a cross-sectional view at a line Y-Y in FIG. 3.

The conventional battery support frame structure T differs from the battery support frame structure S in that the battery support frame structure T includes a plurality of side members 8 without holes into which a battery 9 is inserted, and a plurality of batteries 9, which are provided while being divided into inside and outside the plurality of side members 8 in the vehicle width direction of the vehicle.

The conventional battery support frame structure T includes the plurality of side members 8 and the plurality of batteries 9. The longitudinal direction of the side member 8 is the same as the front-rear direction of the vehicle like the side member 1. The side member 8 is linear in the front-rear direction of the vehicle like the side member 1. The battery support frame structure T includes a left side member 8L and a right side member 8R as the plurality of side members 8. The left side member 8L is provided to the left portion of the vehicle in the vehicle width direction. The right side member 8R is provided to the right portion of the vehicle in the vehicle width direction.

The battery 9 is used as a power supply battery for driving a traveling motor of a hybrid vehicle or an electric vehicle (EV), in the same manner as the battery 2. The battery 9 has a structure similar to that of the battery 2. The battery support frame structure T includes a first battery 9C, a second battery 9L, and a third battery 9R as the plurality of batteries 9. The first battery 9C is provided between the left side member 8L and the right side member 8R. The first battery 9C is supported by the left side member 8L and the right side member 8R via the elastic members (not shown in figures).

The second battery 9L is provided on the left of the left side member 8L in the vehicle width direction of the vehicle. The second battery 9L is supported by the left side member 8L via the elastic members (not shown in figures). The third battery 9R is provided on the right of the right side member 8R in the vehicle width direction of the vehicle. The third battery 9R is supported by the right side member 8R via the elastic members (not shown in figures).

A plurality of batteries are provided while being distributed inside and outside the plurality of side members 8 in the battery support frame structure T. Therefore, for each of the batteries 9 provided inside and outside the plurality of side members 8, it is necessary to provide i) the elastic member (not shown in figures) to suppress stress on the battery 9 caused by forces applied by the side members 8 and ii) a space for the battery 9 to be displaced, between the battery 9 and the side members 8, respectively. As a result, it is difficult to increase a volume of the battery 9 in the battery support frame structure T.

In contrast, the battery support frame structure S includes, as described above, i) the plurality of side members 1 having the holes 11 penetrating therethrough in the vehicle width direction of the vehicle and ii) the battery 2 inserted into the holes 11 of the plurality of side members 1 and whose length in the vehicle width direction is greater than the length between the plurality of side members 1. Therefore, the battery 2 is not divided into inside and outside the plurality of side members 1 in the vehicle width direction of the vehicle in the battery support frame structure S.

As a result, in the battery support frame structure S, it is possible to reduce i) a space in which the elastic member is provided between the battery 2 and the plurality of side members 1 and ii) a space for the battery 2 to be displaced. Therefore, a volume of the battery 2 can be easily increased in the battery support frame structure S.

[Structures of First Member 3 and Second Member 4]

The first member 3 is provided above the battery 2 in a height direction of the vehicle. The longitudinal direction of the first member 3 is the same as a horizontal direction orthogonal to the height direction of the vehicle. The second member 4 is provided below the battery 2 in the height direction of the vehicle. The longitudinal direction of the second member 4 is the same as the horizontal direction orthogonal to the height direction of the vehicle. The first member 3 and the second member 4 are plate-shaped, but are not limited thereto. The first member 3 and the second member 4 may be rod-shaped, for example. The battery support frame structure S has the first member 3 and the second member 4 in this manner, and can therefore protect the battery 2 against a collision from outside the vehicle.

The battery support frame structure S includes a first central member 3C, a first left member 3L, and a first right member 3R as the first member 3. The first central member 3C is provided between the left side member 1L and the right side member 1R. The left end of the first central member 3C is fixed to the left side member 1L. The right end of the first central member 3C is fixed to the right side member 1R. The first left member 3L is provided on the left of the left side member 1L in the vehicle width direction of the vehicle. The right end of the first left member 3L is fixed to the left side member 1L. The first right member 3R is provided on the right of the right side member 1R in the vehicle width direction of the vehicle. The left end of the first right member 3R is fixed to the right side member 1R.

Further, the battery support frame structure S includes a second central member 4C, a second left member 4L, and a second right member 4R as the second member 4. The second central member 4C is provided between the left side member 1L and the right side member 1R. The left end of the second central member 4C is fixed to the left side member 1L. The right end of the second central member 4C is fixed to the right side member 1R. The second left member 4L is provided on the left of the left side member 1L in the vehicle width direction of the vehicle. The right end of the second left member 4L is fixed to the left side member 1L. The second right member 4R is provided on the right of the right side member 1R in the vehicle width direction of the vehicle. The left end of the second right member 4R is fixed to the right side member 1R.

The length in the vehicle width direction of the vehicle between the left end of the first left member 3L and the right end of the first right member 3R and the length in the vehicle width direction of the vehicle between the left end of the second left member 4L and the right end of the second right member 4R are greater than the length of the battery 2 in the vehicle width direction of the vehicle.

In the battery support frame structure S, the first member 3 and the second member 4 are provided in this manner, and so the plurality of side members 1 can support the load due to the collision from outside the vehicle in the vehicle width direction, via the first member 3 and the second member 4. Therefore, in the battery support frame structure S, the battery 2 can be protected against the collision from outside the vehicle in the vehicle width direction.

The third member 5 is provided in front of the battery 2 in the front-rear direction of the vehicle. The longitudinal direction of the third member 5 is the same as the width direction of the vehicle. The third member 5 is plate-shaped, but is not limited thereto. The third member 5 may be rod-shaped, for example. The battery support frame structure S includes a third central member 5C, a third left member 5L, and a third right member 5R as the third member 5.

The third central member 5C is provided between the left side member 1L and the right side member 1R. The left end of the third central member 5C is fixed to the left side member 1L. The right end of the third central member 5C is fixed to the right side member 1R. The third left member 5L is provided on the left of the left side member 1L in the vehicle width direction of the vehicle. The right end of the third left member 5L is fixed to the left side member 1L. The third right member 5R is provided on the right of the right side member 1R in the vehicle width direction of the vehicle. The left end of the third right member 5R is fixed to the right side member 1R. The length in the vehicle width direction of the vehicle between the left end of the third left member 5L and the right end of the third right member 5R is greater than the length of the battery 2 in the vehicle width direction of the vehicle.

The fourth member 6 is provided behind the battery 2 in the front-rear direction of the vehicle. The longitudinal direction of the fourth member 6 is the same as the width direction of the vehicle. The fourth member 6 is plate-shaped, but is not limited thereto. The fourth member 6 may be rod-shaped, for example. The battery support frame structure S includes a fourth central member 6C, a fourth left member 6L, and a fourth right member 6R as the fourth member 6.

The fourth central member 6C is provided between the left side member 1L and the right side member 1R. The left end of the fourth central member 6C is fixed to the left side member 1L. The right end of the fourth central member 6C is fixed to the right side member 1R. The fourth left member 6L is provided on the left of the left side member 1L in the vehicle width direction of the vehicle. The right end of the fourth left member 6L is fixed to the left side member 1L. The fourth right member 6R is provided on the right of the right side member 1R in the vehicle width direction of the vehicle. The left end of the fourth right member 6R is fixed to the right side member 1R. The length in the vehicle width direction of the vehicle between the left end of the fourth left member 6L and the right end of the fourth right member 6R is greater than the length of the battery 2 in the vehicle width direction of the vehicle.

The longitudinal direction of the frame 7 is the same as the front-rear direction of the vehicle. The battery support frame structure S includes a left frame 7L and a right frame 7R as the plurality of frames 7. The left frame 7L is provided to the left portion of the vehicle in the vehicle width direction. The left frame 7L is fixed to the left end of the first left member 3L, the left end of the second left member 4L, the left end of the third left member 5L, and the left end of the fourth left member 6L. The right frame 7R is provided to the right portion of the vehicle in the vehicle width direction. The right frame 7R is fixed to the right end of the first right member 3R, the right end of the second right member 4R, the right end of the third right member 5R, and the right end of the fourth right member 6R.

Shock absorbing members (not shown in figures) are respectively provided on an outer surface of the left frame 7L in the vehicle width direction of the vehicle and an outer surface of the right frame 7R in the vehicle width direction of the vehicle. The shock absorbing members absorb impact energy by being deformed during a collision with an external object. The frame 7 generates a reaction force to deform the shock absorbing members during the collision with the external object.

Effects of Battery Support Frame Structure S According to the Embodiment

The battery support frame structure S according to the embodiment includes the plurality of side members 1 whose longitudinal direction is the same as the front-rear direction of the vehicle and having the holes 11 penetrating therethrough in the vehicle width direction of the vehicle, and the battery 2 that is inserted into the holes 11 of the plurality of side members 1 and whose length in the vehicle width direction is greater than the length between the plurality of side members 1.

The battery support frame structure S according to the embodiment includes the plurality of side members 1 having the holes 11 penetrating therethrough in the vehicle width direction of the vehicle in this manner, and the battery 2 that is inserted into the holes 11 of the plurality of side members 1 and whose length in the vehicle width direction is greater than the length between the plurality of side members 1. Therefore, in the battery support frame structure S, the battery 2 is not divided into inside and outside the plurality of side members 1 in the vehicle width direction of the vehicle.

As a result, in the battery support frame structure S, it is possible to reduce i) the space in which the elastic member is provided to suppress the stress on the battery 2 caused by the forces applied by the side members 1 and ii) the space for the battery 2 to be displaced, between the battery 2 and the plurality of side members 1. Therefore, the volume of the battery 2 can be easily increased in the battery support frame structure S.

The present disclosure is explained on the basis of the exemplary embodiments. The technical scope of the present disclosure is not limited to the scope explained in the above embodiments and it is possible to make various changes and modifications within the scope of the disclosure. For example, all or part of the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

DESCRIPTION OF SYMBOLS

S battery support frame structure
1, 1L, 1R side member
11, 11L, 11R hole
2 battery
3, 3C, 3L, 3R first member
4, 4C, 4L, 4R second member
5, 5C, 5L, 5R third member
6, 6C, 6L, 6R fourth member
7, 7L, 7R frame
T conventional battery support frame structure
8, 8L, 8R side member
9, 9C, 9L, 9R battery

The invention claimed is:

1. A battery support frame structure comprising:
a plurality of side members whose longitudinal direction is the same as a front-rear direction of a vehicle and have a hole penetrating in each of the side members therethrough in a vehicle width direction of the vehicle; and
a battery that is inserted in the holes of the plurality of side members and has a length greater than a distance between the plurality of side members in the vehicle width direction.

2. The battery support frame structure according to claim 1, wherein the side members are linear in the front-rear direction.

3. The battery support frame structure according to claim 1, further comprising:

a first member that is provided above the battery in a height direction of the vehicle; and
a second member that is provided below the battery in the height direction.

4. The battery support frame structure according to claim 3, wherein
a left side member provided to a left portion in the vehicle width direction, and
a right side member provided to a right portion in the vehicle width direction
are provided as the plurality of side members, wherein
a first central member provided between the left side member and the right side member,
a first left member provided on the left of the left side member in the vehicle width direction, and
a first right member provided on the right of the right side member in the vehicle width direction
are provided as the first member, wherein
a second central member provided between the left side member and the right side member,
a second left member provided on the left of the left side member in the vehicle width direction, and
a second right member provided on the right of the right side member in the vehicle width direction
are provided as the second member, wherein
(i) a length in the vehicle width direction between a left end of the first left member and a right end of the first right member and (ii) a length in the vehicle width direction between a left end of the second left member and a right end of the second right member are greater than the length of the battery in the vehicle width direction.

5. The battery support frame structure according to claim 4, further comprising:
a third member that is provided in front of the battery in the front-rear direction; and
a fourth member that is provided behind the battery in the front-rear direction.

6. The battery support frame structure according to claim 5, wherein
a third central member provided between the left side member and the right side member,
a third left member provided on the left of the left side member in the vehicle width direction, and
a third right member provided on the right of the right side member in the vehicle width direction
are provided as the third member, wherein
a fourth central member provided between the left side member and the right side member,
a fourth left member provided on the left of the left side member in the vehicle width direction, and
a fourth right member provided on the right of the right side member in the vehicle width direction
are provided as the fourth member, wherein
(i) a length in the vehicle width direction between a left end of the third left member and a right end of the third right member and (ii) length in the vehicle width direction between a left end of the fourth left member and a right end of the fourth right member are greater than the length of the battery in the vehicle width direction.

7. The battery support frame structure according to claim 6, further comprising:
a left frame whose longitudinal direction is the same as the front-rear direction and is provided on the left of the left side member in the vehicle width direction; and a right frame whose longitudinal direction is the same as the front-rear direction and is provided on the right of the right side member in the vehicle width direction, wherein the left frame is fixed to a left end of the first left member, a left end of the second left member, a left end of the third left member, and a left end of the fourth left member, and the right frame is fixed to a right end of the first right member, a right end of the second right member, a right end of the third right member, and a right end of the fourth right member.

8. The battery support frame structure according to claim 1, wherein the battery is supported by the plurality of side members via elastic members while the battery is inserted into the holes of the plurality of side members.

9. The battery support frame structure according to claim 1, wherein a length of the battery in the vehicle width direction of the vehicle is greater than a length in the vehicle width direction of the vehicle between a left end of a left side member and a right end of a right side member of the plurality of side members.

10. The battery support frame structure according to claim 1, wherein the battery is not divided into inside and outside the plurality of side members in the vehicle width direction of the vehicle.

11. The battery support frame structure according to claim 1, wherein the plurality of side members includes a left side member and a right side member, and wherein portions of the battery extend laterally beyond both the left side member and the right side member in the vehicle width direction.

* * * * *